US012259465B2

(12) United States Patent
Sumiya et al.

(10) Patent No.: US 12,259,465 B2
(45) Date of Patent: Mar. 25, 2025

(54) RADAR APPARATUS, IMAGING METHOD, AND NON-TRANSITORY STORAGE MEDIUM

(71) Applicant: NEC Corporation, Tokyo (JP)

(72) Inventors: Tatsuya Sumiya, Tokyo (JP); Kazumine Ogura, Tokyo (JP); Masayuki Ariyoshi, Tokyo (JP); Toshiyuki Nomura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 374 days.

(21) Appl. No.: 17/705,605

(22) Filed: Mar. 28, 2022

(65) Prior Publication Data

US 2022/0350016 A1  Nov. 3, 2022

(30) Foreign Application Priority Data

Apr. 8, 2021  (JP) ................. 2021-065684

(51) Int. Cl.
*G01S 13/89*  (2006.01)
*G01S 7/40*  (2006.01)
(Continued)

(52) U.S. Cl.
CPC ............... *G01S 13/89* (2013.01); *G01S 7/40* (2013.01); *G01S 7/415* (2013.01); *G01S 13/5242* (2013.01)

(58) Field of Classification Search
CPC . G01S 13/89; G01S 7/40; G01S 7/415; G01S 13/5242
See application file for complete search history.

(56) References Cited

U.S. PATENT DOCUMENTS 7,456,780 B1  11/2008  Garren
2004/0032361 A1*  2/2004  Kirscht ............... G01S 13/9029
342/25 R
(Continued)

FOREIGN PATENT DOCUMENTS

JP  2003-161779 A  6/2003
JP  2007-114098 A  5/2007
(Continued)

OTHER PUBLICATIONS

S. S. Ahmed, A. Schiessl, F. Gumbmann, M. Tiebout. S. Methfessel and L. Schmidt, 'Advanced Microwave Imaging,' in IEEE Microwave Magazine, vol. 13, No. 6, pp. 26 to 43, Sep. and Oct. 2012, doi: 10.1109/MMM.2012.2205772.

(Continued)

*Primary Examiner* — Peter M Bythrow
*Assistant Examiner* — Nazra Nur Waheed

(57) ABSTRACT

Provided is a method for movement estimation and movement compensation of a target object that can be applied without introducing restrictions on antenna placement. The present invention provides a radar apparatus including: a radar signal transmission-reception unit acquiring a radar signal acquired by measurement using a transmission antenna and a reception antenna, and a measurement time of the radar signal; a velocity candidate control unit holding a setting of a velocity candidate set of a target object; a velocity estimation imaging unit generating a radar image applied with movement compensation by using each velocity candidate; a velocity estimation unit selecting an estimated velocity from a velocity candidate set, based on comparison of each generated radar image; and an output image imaging unit generating a final output image applied with movement compensation using an estimated velocity.

18 Claims, 20 Drawing Sheets

(51) Int. Cl.
*G01S 7/41* (2006.01)
*G01S 13/524* (2006.01)

(56) References Cited

U.S. PATENT DOCUMENTS

2010/0245076 A1 9/2010 Jo et al.
2020/0116850 A1* 4/2020 Santra .................. A61B 5/0507

FOREIGN PATENT DOCUMENTS

| JP | 2007-292532 | A | 11/2007 |
| JP | 2010-256079 | A | 11/2010 |
| JP | 2013-181881 | A | 9/2013 |
| JP | 2013-205030 | A | 10/2013 |
| WO | 2020/261526 | A1 | 12/2020 |

OTHER PUBLICATIONS

S. Scott and J. Wawrzynek, 'Characterization of three-dimensional near-field microwave imaging algorithms for stationary and moving objects,' 2016 IEEE Mtt-S International Microwave Symposium (IMS), San Francisco, CA, 2016, pp. 1 to 4, doi: 10.1109/MWSYM.2016.7539974.
J. MacQueen, 'Some Methods for Classification and Analysis of Multivariate Observations,' Proc. of the Fifth Berkeley Symposium on Math. Stat and Prob., vol. 1, pp. 281 to 296, 1967.
JP Office Communication for JP Application No. 2021-065684, mailed on Dec. 24, 2024 with English Translation.
Gui, Shuliang et al., "Analysis of Security Imaging Method for Walking Human Screening With Single Channel Synthetic Aperture Radar", IEEE Access, the U.S., IEEE, Jul. 25, 2019, vol. 7, p. 111363-111374.
Sumiya, Tatsuya et al., "Motion Blur Suppression Accommodating to Fast Radar Imaging for Walk-Through Concealed Weapon Detection". 2020 IEEE Radar Conference (Radar Conf20), the U.S .. IEEE. Dec. 4, 2020, p. 1-6, Date of Conference:Sep. 21-25, 2020.

* cited by examiner

◎ TRANSMISSION ANTENNA (Tx)
○ RECEPTION ANTENNA (Rx)

RADAR APPARATUS, IMAGING METHOD, AND NON-TRANSITORY STORAGE MEDIUM

TECHNICAL FIELD

The present invention relates to a radar apparatus, an imaging method, and an imaging program for receiving an electromagnetic wave reflected by an object and performing imaging.

BACKGROUND ART

Radar apparatuses providing body scanners are installed at airports and the like. In a radar apparatus, a transmission antenna projects an electromagnetic wave such as a millimeter wave onto a target object (such as a body and belongings of a subject) in a predetermined area, and a reception antenna receives the electromagnetic wave reflected by the target object as a radar signal. A body scanner system performs generation (imaging) of a radar image, based on a radar signal, and for example, executes inspection of whether a subject carries a suspicious object. From a viewpoint of increasing throughput, it is desirable that a subject can undergo inspection while walking without stopping.

"S. S. Ahmed, A. Schiessl, F. Gumbmann, M. Tiebout, S. Methfessel and L. Schmidt, 'Advanced Microwave Imaging,' in IEEE Microwave Magazine, vol. 13, no. 6, pp. 26 to 43, September and October 2012, doi: 10.1109/MMM.2012.2205772" (Non-Patent Document 1) describes a technology for receiving an electromagnetic wave reflected by a target object by an antenna and generating (imaging) a radar image of the target object, based on the received radar signal.

"S. Scott and J. Wawrzynek, 'Characterization of three-dimensional near-field microwave imaging algorithms for stationary and moving objects,' 2016 IEEE MTT-S International Microwave Symposium (IMS), San Francisco, CA, 2016, pp. 1 to 4, doi: 10.1109/MWSYM.2016.7539974" (Non-Patent Document 2) describes a method for performing velocity estimation of a target object, based on the Doppler effect, and performing imaging compensating for movement based on the estimation.

"J. MacQueen, 'Some Methods for Classification and Analysis of Multivariate Observations,' Proc. of the Fifth Berkeley Symposium on Math. Stat and Prob., vol. 1, pp. 281 to 296, 1967" (Non-Patent Document 3) describes the k-means method being a clustering algorithm.

DISCLOSURE OF THE INVENTION

FIG. 1 is a block diagram illustrating a configuration example of a common radar apparatus.

The radar apparatus 800 illustrated in FIG. 1 includes a radar signal transmission-reception unit 803 and an imaging unit 807. The radar signal transmission-reception unit 803 controls emission of an electromagnetic wave (specifically, an emission timing and the like) by a transmission antenna (Tx) 801 emitting the electromagnetic wave and acquires a radar signal from a reception antenna (Rx) 802 receiving a reflected wave from a target object, and the like. For example, the imaging unit 807 performs generation (imaging) of a radar image from the radar signal by the method described in Non-Patent Document 1.

The radar apparatus 800 performs generation of a radar image by the imaging unit 807 under the assumption that a target object is at a standstill during measurement by the radar signal transmission-reception unit 803. Accordingly, in an operation for increasing throughput, such as performing inspection without stopping a subject, image capture blurring occurs in a radar image due to movement during walking or the like, and inspection precision is degraded.

In order to suppress image capture blurring, imaging needs to be performed with compensation for movement of a target object. To do so, movement information of the target object needs to be acquired. As a means for acquiring movement information of a target object by using a radar, a velocity measurement method using the Doppler effect is known. For example, Non-Patent Document 2 describes a method for performing velocity estimation of a target object, based on the Doppler effect, and performing imaging compensating for movement based on the estimation. In the velocity measurement using the Doppler effect, a Tx and an Rx are placed in front of a target object as illustrated in FIG. 2 and functions well in a situation in which the target object moves toward the Tx and the Rx. The reason is that, what can be measured by using the Doppler effect is a time variation amount dR/dt of a propagation distance R (the sum of the distance between the Tx and the target object and the distance between the target object and the Rx) of an electromagnetic wave, and the time variation amount is almost equal to twice the velocity $v_x$ of the target object regardless of the position of the target object. In other words, the velocity of the target object can be computed as $v_x = \frac{1}{2} \times dR/dt$.

On the other hand, from a viewpoint of operational convenience in a use as a body scanner or the like, a configuration as illustrated in FIGS. 3A and 3B in which sensor panels including a Tx and an Rx, respectively, are placed on both sides of a passage in a gate form is desirable. In such a situation, velocity estimation of a target object based on the Doppler effect is difficult. Even when a target object moves at the same velocity $v_x$, the time variation amount dR/dt of the electromagnetic wave propagation distance R takes different values due to the difference in the position in the sensor panel as illustrated in each of FIG. 3A and FIG. 3B [dR/dt in FIG. 3B is smaller]. Thus, dR/dt acquired by using the Doppler effect and the moving velocity $v_x$ of the target object are not in a one-to-one relation, and therefore velocity estimation is difficult. Further, what is actually acquired is not a single value of dR/dt but superposition of contributions by dR/dt related to various points on a human body, which is also making velocity estimation difficult.

An object of the present invention is to provide a method for movement estimation and movement compensation of a target object, the method being able to be applied without introducing restrictions on antenna placement.

The present invention provides a radar apparatus including:
- a radar signal transmission-reception unit acquiring a radar signal acquired by measurement using a transmission antenna and a reception antenna, and a measurement time of the radar signal;
- a velocity candidate control unit holding a setting of a velocity candidate set of a target object;
- a velocity estimation imaging unit generating a radar image applied with movement compensation by using each velocity candidate;

a velocity estimation unit selecting an estimated velocity from a velocity candidate set, based on comparison of each generated radar image; and an output image imaging unit generating a final output image applied with movement compensation using an estimated velocity.

Further, the present invention provides an imaging method including, by a computer:

acquiring a radar signal acquired by measurement using a transmission antenna and a reception antenna, and a measurement time of the radar signal;

holding a setting of a velocity candidate set of a target object;

generating a radar image applied with movement compensation by using each velocity candidate;

selecting an estimated velocity from a velocity candidate set, based on comparison of each generated radar image; and generating a final output image applied with movement compensation using an estimated velocity.

Further, the present invention provides an imaging program causing a computer to function as:

a radar signal transmission-reception means for acquiring a radar signal acquired by measurement using a transmission antenna and a reception antenna, and a measurement time of the radar signal;

a velocity candidate control means for holding a setting of a velocity candidate set of a target object;

a velocity estimation imaging means for generating a radar image applied with movement compensation by using each velocity candidate;

a velocity estimation means for selecting an estimated velocity from a velocity candidate set, based on comparison of each generated radar image; and an output image imaging means for generating a final output image applied with movement compensation using an estimated velocity.

The present invention enables application of movement estimation of a target object even to a configuration with antenna placement making velocity estimation based on the Doppler effect difficult, such as a body scanner in a gate form, and further enables generation of a radar image undergoing movement compensation based on the estimation. Consequently, image capture blurring in the radar image is suppressed, and inspection precision is improved.

DESCRIPTION OF EMBODIMENTS

Figure 1:
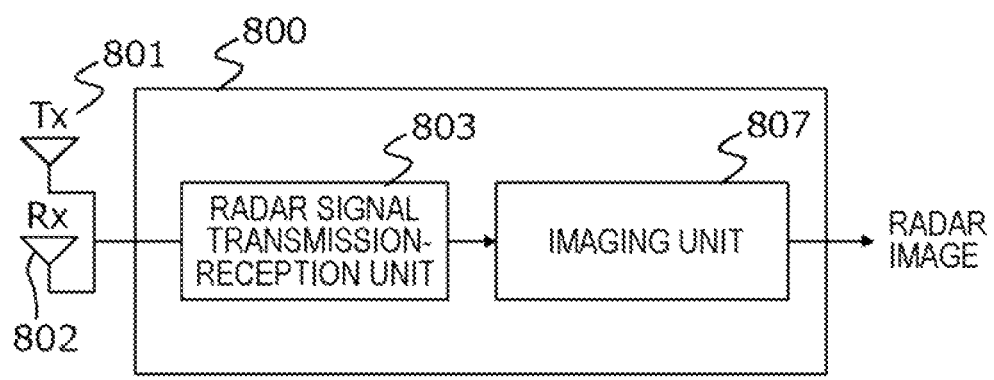
FIG. 1 is a block diagram illustrating a configuration example of a common radar apparatus.
Figure 2:
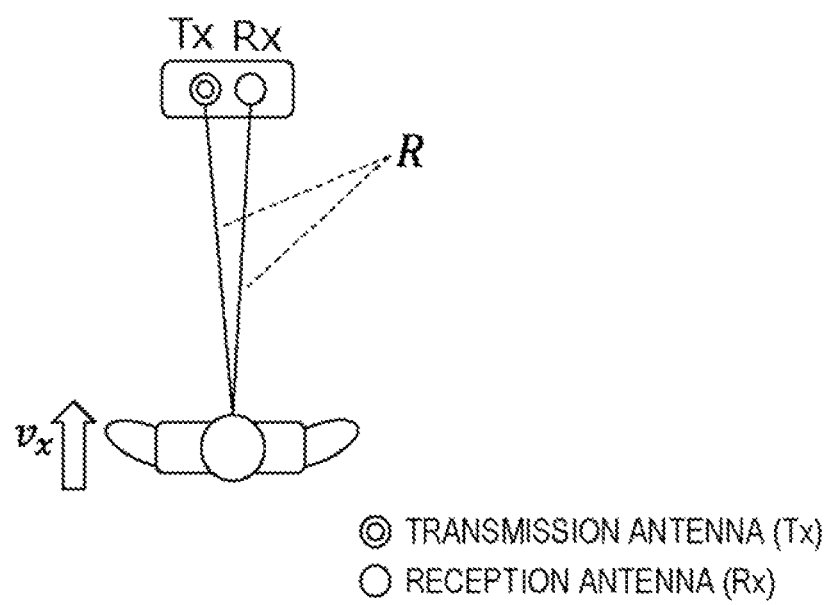
FIG. 2 is a diagram illustrating a situation in which velocity estimation based on the Doppler effect functions.

Example embodiments of the present invention are described below with reference to drawings. Note that similar components are given similar signs, and description thereof is omitted as appropriate. Note that a vector is expressed by a character and an arrow indicated thereon, or a character and an index "vec," herein and in the drawings. For example, an X vector is expressed by X and an arrow indicated thereon, or $X_{vec}$.

First Example Embodiment

Description of Configuration

Figure 4:
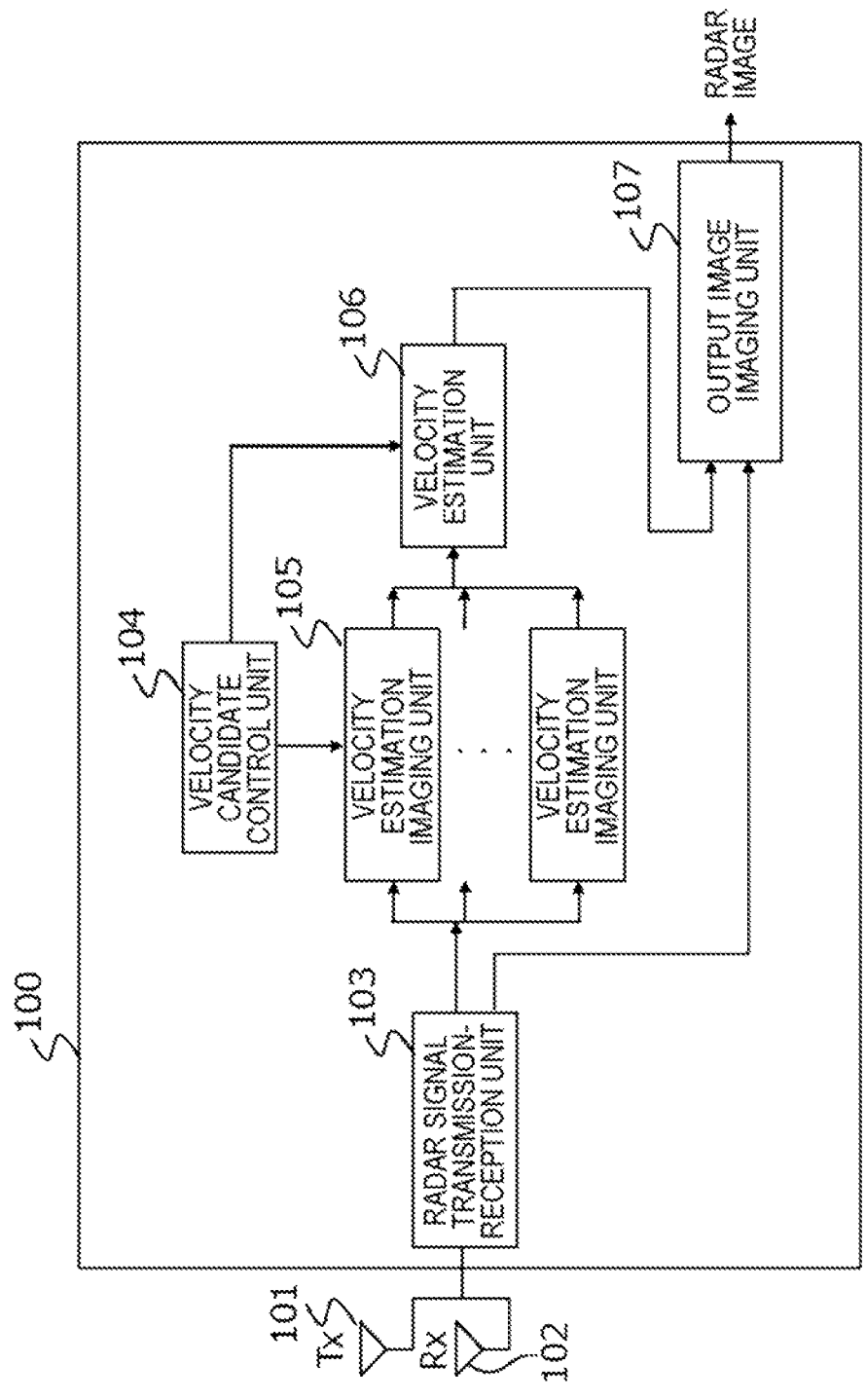
FIG. 4 is a block diagram illustrating a configuration example of a radar apparatus according to a first example embodiment.

FIG. 4 is a block diagram illustrating a configuration example of a radar apparatus according to a first example embodiment. The radar apparatus 100 according to the first example embodiment includes a radar signal transmission-reception unit 103, a velocity candidate control unit 104, a velocity estimation imaging unit 105, a velocity estimation unit 106, and an output image imaging unit 107. The radar signal transmission-reception unit 103 includes a transmission antenna (Tx) 101 and a reception antenna (Rx) 102.

The radar signal transmission-reception unit 103 controls emission of an electromagnetic wave (specifically, an emission timing and the like) by the transmission antenna (Tx) 101 emitting the electromagnetic wave such as a millimeter wave and acquires a radar signal from the reception antenna (Rx) 102 receiving a reflected wave from a target object, and the like.

Figure 5:
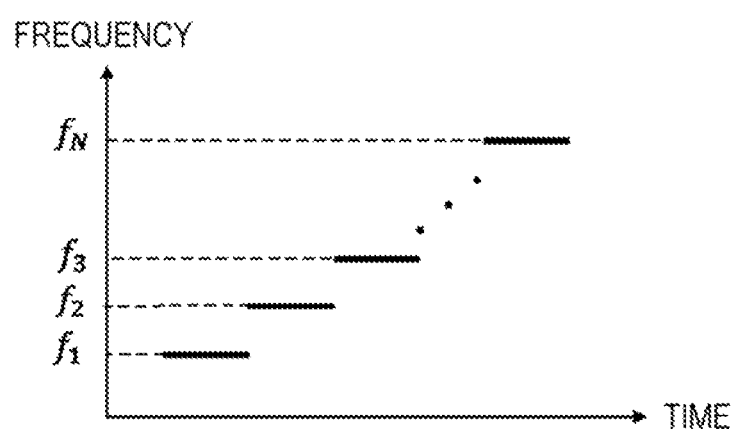
FIG. 5 is a diagram illustrating a stepped frequency continuous wave (SFCW).
Figure 6:
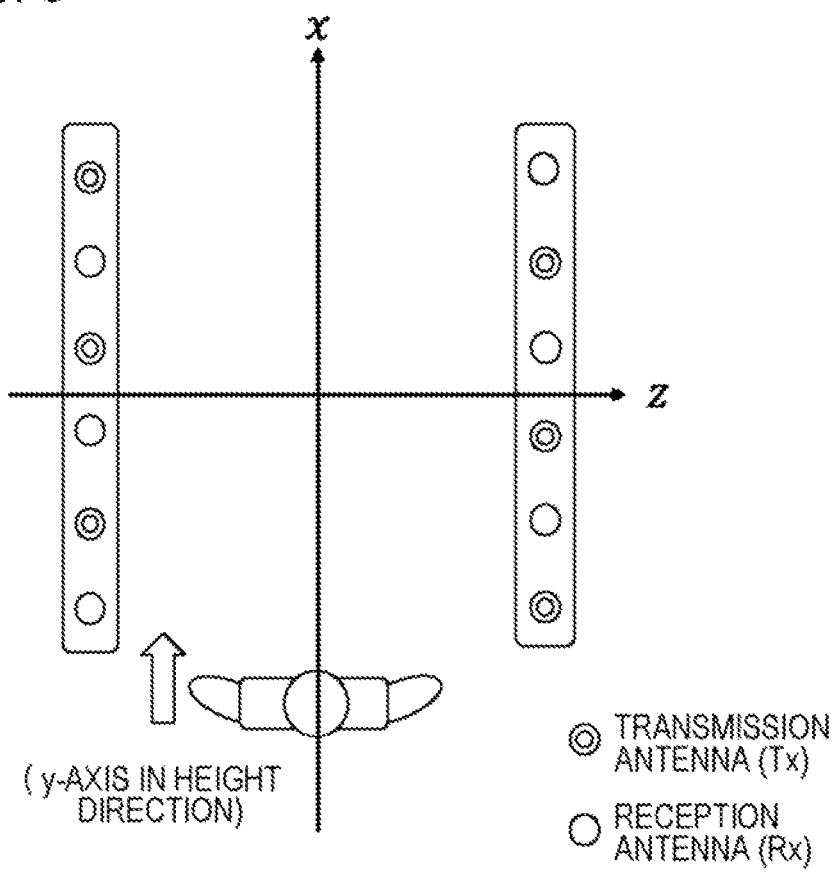
FIG. 6 is a diagram illustrating an example of a method for installing a transmission antenna and a reception antenna, and a coordinate system.

Examples of a usable electromagnetic wave projected by the transmission antenna 101 include a continuous wave (CW), a frequency modulated CW (FMCW), and a stepped frequency continuous wave (SFCW). An SFCW as illustrated in FIG. 5 in which the frequency varies with time is described as an example in the present example embodiment. Note that while one transmission antenna (Tx) 101 and one reception antenna (Rx) 102 are illustrated in FIG. 4, at least either one of the transmission antenna (Tx) 101 and the reception antenna (Rx) 102 may be installed with a quantity greater than one. Examples of the installation method include a configuration in which two sensor panels each including a Tx and an Rx are arranged in a gate form as illustrated in FIG. 6. An x-y-z coordinate system including a passage direction (moving direction) as an x-axis, a height direction as a y-axis, and a lateral direction relative to the passage direction as a z-axis, as illustrated in FIG. 6, is hereinafter used.

The reception antenna 102 measures a complex amplitude (a complex number representing an amplitude and a phase shift from a transmission wave) of a reception wave for each frequency and determines the measurement result to be a radar signal. A radar signal can be represented by S(n, m, f) with the number n of Tx's, the number m of Rx's, and a frequency f as arguments.

In addition to a radar signal S(n, m, f), the radar signal transmission-reception unit 103 also acquires a measurement time t(n, m, f) of the radar signal. The time is a relative time having a timing before the end of emission of an electromagnetic wave by every Tx (such as the start of emission of an electromagnetic wave by a first Tx) as a time 0. The measurement time t(n, m, f) may be computed by the radar signal transmission-reception unit 103 by imparting a time measurement function to the unit or may be computed based on previous anticipation from the control method of the Tx and the Rx. Note that, in general, emission of one SFCW by each Tx as illustrated in FIG. 5 is negligibly short. In such a case, a measurement time is almost independent of the frequency f, and therefore the time may be simply represented by t(n, m). Further, simultaneous projection by a plurality of Tx's causes radio interference on one hand but enables simultaneous reception by a plurality of Rx's on the other hand. In such a case, a measurement time does not depend on the number m of Rx's, and therefore the time may be simply represented by t(n, f) [or t(n) when the time does not depend on the frequency f either as described above]. The radar signal transmission-reception unit 103 outputs the aforementioned radar signal and the measurement time thereof to the velocity estimation imaging unit 105 and the output image imaging unit 107.

The velocity candidate control unit 104 is responsible for a function of holding a candidate set $V_{cand}$ of values possibly existing as velocities of a target object and conveying the held values to the velocity estimation imaging unit 105 and the velocity estimation unit 106. For example, the velocity candidate set is set by an administrator in advance. Examples of a setting method include a method of using 16 levels of candidate values in steps of 0.1 m/s in the x-direction as expressed in the following equation 1, taking into consideration that a common walking velocity is about 1.1 m/s. Note that $v_{vec,n}$ illustrated in equation 1 indicates velocities in the x-direction, the y-direction, and the z-direction in this order. Assuming that the target object is moving straight in the passage direction, the values for the y-direction and the z-direction are 0 m/s, and only the x-direction takes a value other than 0. Note that the example is strictly an example, and the method is not limited thereto. A likely velocity is selected from $V_{cand}$ by the velocity estimation unit 106 described later.

$$V_{cand} = \{\vec{v}_n = (0.1n \text{ m/s}, 0 \text{ m/s}, 0 \text{ m/s}) | n = 0, 1, \ldots, 15\} \quad \text{equation 1}$$

Figure 8:
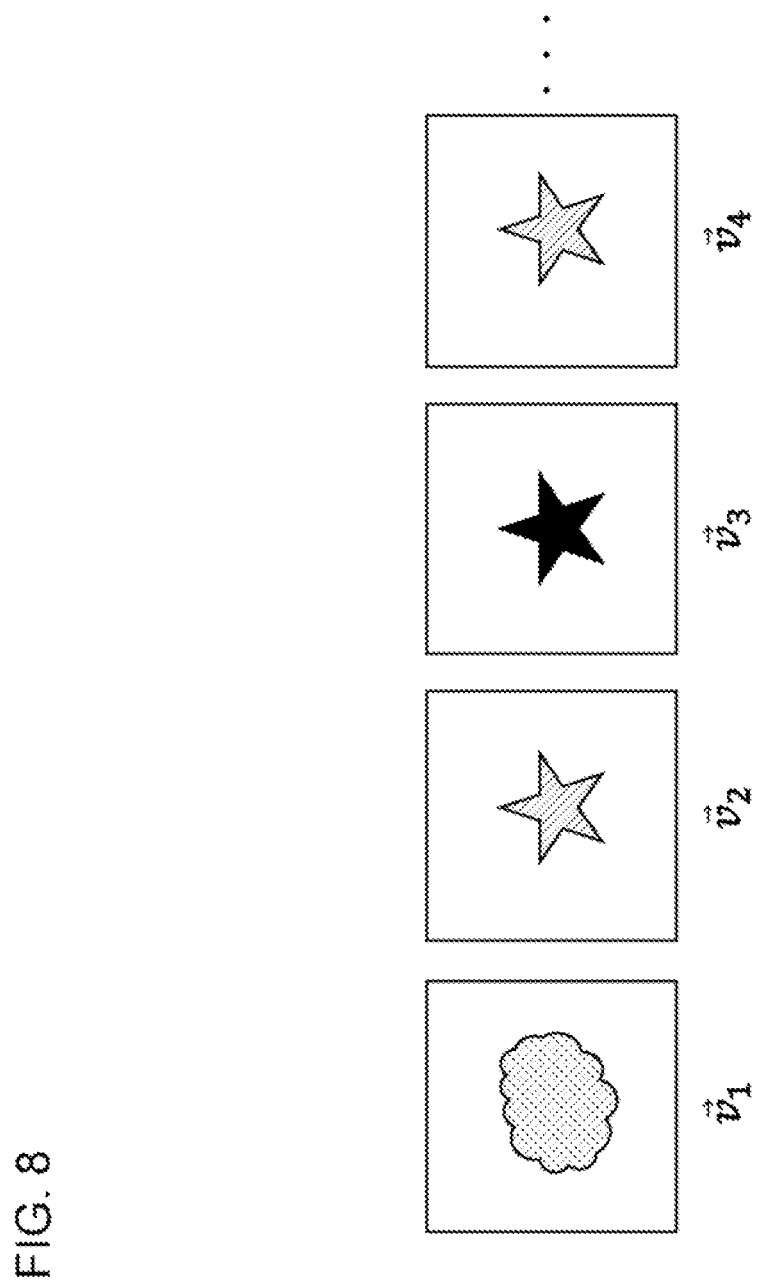
FIG. 8 is a diagram illustrating an example of a radar image undergoing movement compensation by using each velocity candidate.

Velocity estimation imaging units 105 as many as the number of elements of the velocity candidate set $V_{cand}$ held by the velocity candidate control unit 104 are required. Each velocity estimation imaging unit 105 is responsible for each velocity candidate $v_{vec}$ (one of candidates included in $V_{cand}$), generates a radar image undergoing movement compensation by using the velocity, and outputs the generated image to the velocity estimation unit 106. FIG. 8 illustrates an example of an image generated by each of a plurality of velocity estimation imaging units 105. A velocity candidate $v_{vec}$ tied to each image is indicated, a velocity estimation imaging unit 105 generating the image being responsible for the velocity candidate $v_{vec}$. A focused image is expected to be generated when the velocity candidate $v_{vec}$ for which the velocity estimation imaging unit 105 is responsible is close to an actual velocity. In the example in FIG. 8, $v_{vec,3}$ is a velocity candidate $v_{vec}$ closest to the actual velocity out of $v_{vec,1}$ to $v_{vec,4}$ and is the most focused image. Then, $v_{vec,1}$ is a velocity candidate $v_{vec}$ farthest from the actual velocity out of $v_{vec,1}$ to $v_{vec,4}$ and is the least focused image.

Figure 7:
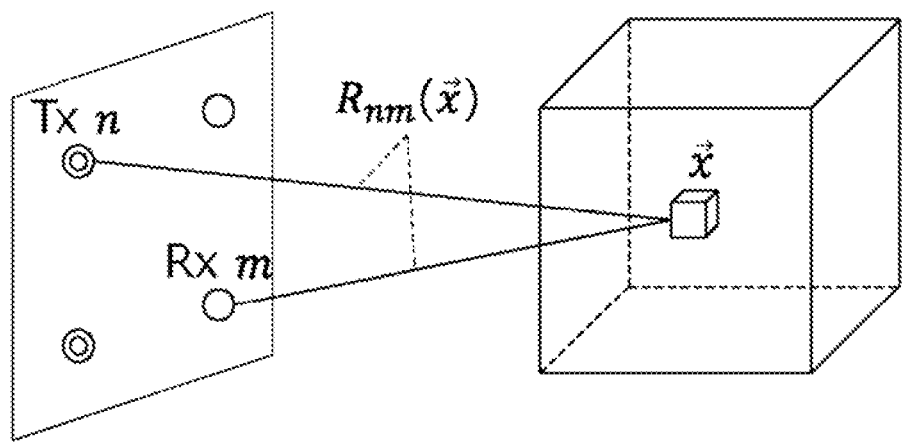
FIG. 7 is a diagram illustrating a relation between a position of each of a transmission antenna, a reception antenna, and $x_{vec}$, and a distance $R_{nm}(x_{vec})$.

A method based on the imaging method described in NPL 1 is described as an example of a method for generating a radar image undergoing movement compensation. When a target object is at a standstill, a radar image $I(x_{vec})$ is computed in accordance with equation 2. Note that c represents the light velocity. Further, $x_{vec}$ represents the position of each cell when an imaging space is divided in a voxel form (mesh form), and $R_{nm}(x_{vec})$ represents the total of the distance between a number n Tx and $x_{vec}$ and the distance between $x_{vec}$ and a number m Rx, as illustrated in FIG. 7.

$$I(\vec{x}) = \sum_n \sum_m \sum_f S(n, m, f) \exp\left[i \frac{2\pi f}{c} R_{nm}(\vec{x})\right] \quad \text{equation 2}$$

When a target object is moving at a velocity $v_{vec}$, the target object at an initial position $x_{vec}$ moves to $(x_{vec} + v_{vec} \times t)$ at a time t. Accordingly, by modifying equation (2) as equation (3), a radar image $I_{v\_vec}(x_{vec})$ undergoing movement compensation based on the velocity $v_{vec}$ can be generated. The measurement time t(n, m, f) of the radar signal S(n, m, f) may be simply represented by t(n, m), t(n, f), or t(n) as described above.

$$I_v(\vec{x}) = \sum_n \sum_m \sum_f S(n, m, f) \exp\left[i \frac{2\pi f}{c} R_{nm}(\vec{x} + \vec{v}t(n, m, f))\right] \quad \text{equation 3}$$

An image generated by the velocity estimation imaging unit 105 is not a final output image actually used for suspicious object inspection and the like but is an image used only for velocity estimation and therefore does not need to include detailed information about an object shape. Accordingly, an amount of computation may be reduced by computing $I_{v\_vec}(x_{vec})$ in accordance with equation 3 by using coarse voxel division (sparse $x_{vec}$). Further, an amount of computation may be reduced by computing the sum with limited n, m, and f instead of every n, m, and f.

The velocity estimation unit 106 selects a likely velocity candidate $v_{vec}$ from $V_{cand}$, based on each movement-compensation-applied image $I_{v\_vec}(x_{vec})$ generated by the velocity estimation imaging unit 105 by using equation 3, and outputs the selected velocity candidate $v_{vec}$ to the output image imaging unit 107.

Examples of a selection method include a method by comparison based on intensity of each image $I_{v\_vec}(x_{vec})$. For example, maximum intensity $P_{v\_vec}$ of a radar image $I_{v\_vec}(x_{vec})$ based on the velocity $v_{vec}$, the maximum intensity $P_{v\_vec}$ being computed in accordance with equation 4, is used as an indicator used for the comparison. In that case, a velocity candidate $v_{vec}$ maximizing the maximum intensity $P_{v\_vec}$ is selected from $V_{cand}$ and is output as an estimated velocity $v_{vec,est}$.

$$P_{\vec{v}} = \max_{\vec{x}} |I_{\vec{v}}(\vec{x})| \qquad \text{equation 4}$$

A method of using total intensity or the like instead of the maximum intensity $P_{v\_vec}$ of a radar image $I_{v\_vec}(x_{vec})$ may also be considered as an indicator used for the comparison.

Note that the method based on comparison of maximum intensity as described above uses only a value of one cell being the maximum value of each radar image and therefore may lack stability. For example, even when a certain velocity candidate $v_{vec}$ is significantly different from an actual velocity, a value of a certain cell in the radar image may become large by coincidence, and the velocity candidate $v_{vec}$ may be erroneously selected as an estimated velocity. Thus, a method for increasing stability by combining and selecting information based on a plurality of cells (all cells or part of a plurality of cells) instead of using only a maximum value may be used. As a means for combining information based on a plurality of cells, an example of computing a static (such as the mean, the maximum value, the minimum value, the mode, or the median) of values of a plurality of cells and outputting a velocity candidate $v_{vec}$ tied to a radar image maximizing the static as an estimated velocity may be considered. In addition, a method described below may also be considered. The method described below is particularly useful when only movement in the x-direction is considered as is the case with equation 1.

First, each radar image being a three-dimensional image with equation 5 as an argument is projected in the x-direction as expressed in equation 7, and a two-dimensional image $J_{v\_vec}(y, z)$ is acquired. Then, a plurality of velocity candidates $v_{vec}$ are ranked in descending order of $J_{v\_vec}(y, z)$ for each cell (y, z), and velocity selection is performed by combining scores related to the ranks for all cells. Ranks assigned to the plurality of velocity candidates $v_{vec}$ at each cell (y, z) are represented as equation 6. Further, a score score(r) related to a rank r is preset (such as score(r)=$0.8^{r-1}$). A velocity candidate $v_{vec}$ maximizing $Q_{v\_vec}$ being acquired by totaling the scores for all cells (y, z) and being computed in accordance with equation 8 is selected and is output as an estimated velocity $v_{vec,est}$.

$$\vec{x} = (x, y, z) \qquad \text{equation 5}$$

$$\text{rank}(\vec{v}|y, z)(= 1, 2, \ldots, |V_{cand}|) \qquad \text{equation 6}$$

$$J_{\vec{v}}(y, z) = \max_{x} |I_{\vec{v}}(x, y, z)| \qquad \text{equation 7}$$

$$Q_{\vec{v}} = \sum_{(y,z)} \text{score}(\text{rank}(\vec{v}|y, z)) \qquad \text{equation 8}$$

However, a cell (y, z) in which no target object is captured does not include information about velocity, and using information of such a cell is meaningless. Thus, only a cell having a certain intensity K or greater, that is, a cell (y, z) satisfying equation 9 may be used in computation of equation 8. Examples of a method for setting the threshold value K include setting the value in accordance with equation 10 by using a coefficient $\alpha$ equal to or greater than 0 and equal to or less than 1 (such as 0.3).

$$\max_{\vec{v} \in V_{cand}} |J_{\vec{v}}(y, z)| \geq K \qquad \text{equation 9}$$

$$K = \alpha \times \max_{\vec{v} \in V_{cand}} \max_{(x,y,z)} |I_{\vec{v}}(x, y, z)| \qquad \text{equation 10}$$

Figure 9:
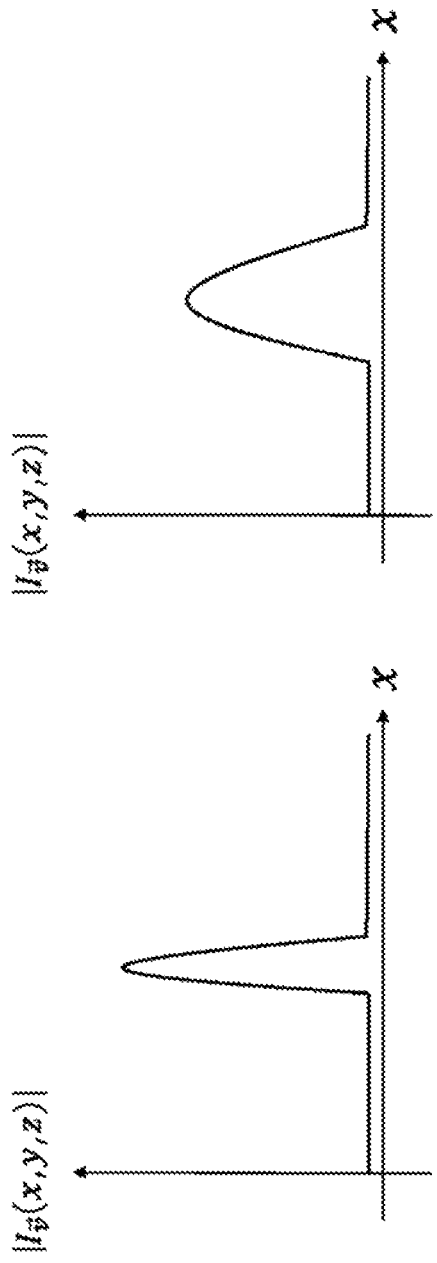
FIG. 9 is a diagram illustrating an example of a radar image intensity distribution in an x-direction for certain (y, z) in each case of with and without image capture blurring.

Note that the reason for initially converting a radar image into a two-dimensional image by projection in the x-direction is that an intensity peak is broadened with respect to the x-axis being the movement direction when image capture blurring exists, and the number of cells having a certain intensity or greater may increase. As an example, FIG. 9 illustrates radar image intensity distributions in the x-direction for a certain cell (y, z) with and without image capture blurring, respectively. When computation of a total score as expressed in equation 8 is performed on a radar image still being a three-dimensional image, a large value may be contrarily acquired when there is a mismatch with an actual velocity, due to image capture blurring in the x-direction. Therefore, projection is initially performed with respect to the x-direction.

The output image imaging unit 107 generates a radar image in accordance with equation 3 by using an estimated velocity $v_{vec,est}$ computed by the velocity estimation unit 106. The generated radar image is a final output image actually used for suspicious object inspection and the like and needs to include detailed information about an object shape. Accordingly, it is desirable to compute $I_{v\_vec}(x_{vec})$ in accordance with equation 3 by using fine voxel division (dense $x_{vec}$).

Description of Operation

Figure 10:
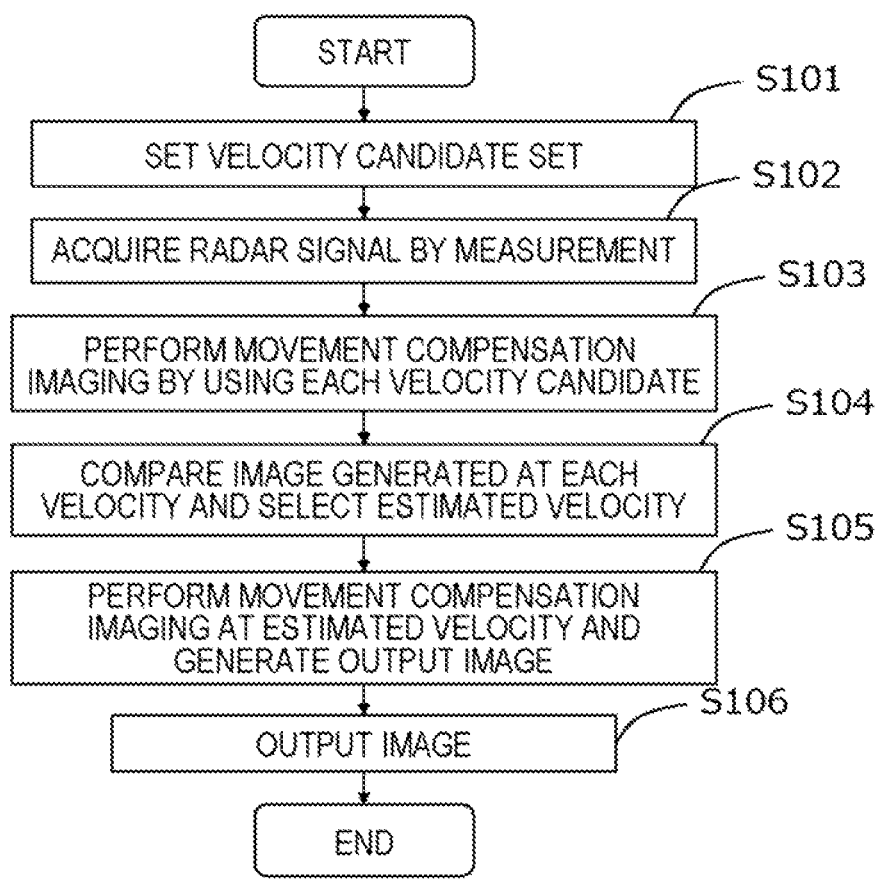
FIG. 10 is a flowchart illustrating operation of the radar apparatus according to the first example embodiment.

Next, operation of the radar apparatus 100 is described with reference to a flowchart in FIG. 10.

In Step S101, a velocity candidate set $V_{cand}$ is set to the velocity candidate control unit 104, and velocity estimation imaging units 105 as many as the number of velocity candidates $v_{vec}$ are prepared.

In Step S102, the radar signal transmission-reception unit 103 causes the transmission antenna (Tx) 101 to emit an electromagnetic wave, acquires a radar signal S(n, m, f) based on a reception wave received by the reception antenna (Rx) 102 and the measurement time t(n, m, f) of the radar signal, and outputs the acquired radar signal and the acquired measurement time to the velocity estimation imaging unit 105 and the output image imaging unit 107. Note that the arguments m and f of the measurement time may be omitted as appropriate.

In Step S103, each velocity estimation imaging unit 105 generates a radar image $I_{v\_vec}(x_{vec})$ applied with movement compensation in accordance with equation 3 by using a velocity candidate $v_{vec}$ for which the velocity estimation imaging unit 105 is responsible. The radar image $I_{v\_vec}(x_{vec})$ is output to the velocity estimation unit 106.

In Step S104, the velocity estimation unit 106 compares the radar images $I_{v\_vec}(x_{vec})$ and outputs a likely velocity candidate $v_{vec}$ to the output image imaging unit 107 as an estimated velocity $V_{vec,est}$.

In Step S105, the output image imaging unit 107 generates a final output image $I_{v\_vec}(x_{vec})$ actually used for suspicious object inspection and the like, in accordance with equation 3, by using the estimated velocity $v_{vec,est}$.

In Step S106, the output image imaging unit 107 outputs the generated radar image $I_{v\_vec}(x_{vec})$ to an object detection engine, a display, or the like.

Description of Effects

Figure 3A:
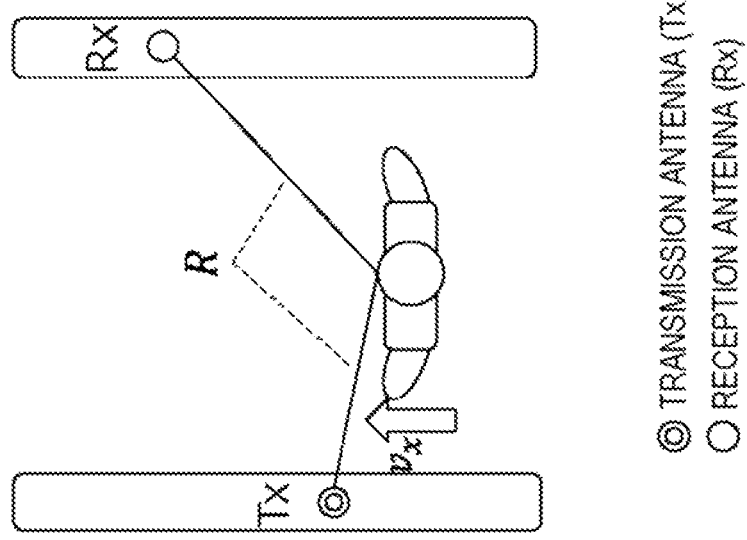
FIGS. 3A and 3B are diagrams illustrating a situation in which velocity estimation based on the Doppler effect does not function.
Figure 3B:
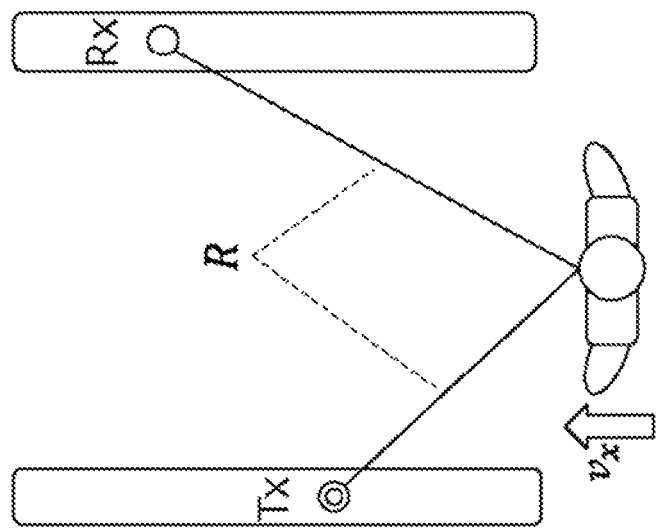

Employment of a method of directly estimating moving velocity being a desired parameter by using a radar image enables application of velocity estimation to a configuration with antenna placement as illustrated in FIGS. 3A and 3B in which velocity estimation based on the Doppler effect is difficult. Further, since a radar image is generated by combining information of a radar signal acquired by a plurality of pairs of the Tx and the Rx, higher stability is expected compared with a case of using only a specific pair. Application of movement compensation using estimated velocity enables generation of a high-precision radar image in which image capture blurring is suppressed.

Second Example Embodiment

Description of Configuration

Figure 11:
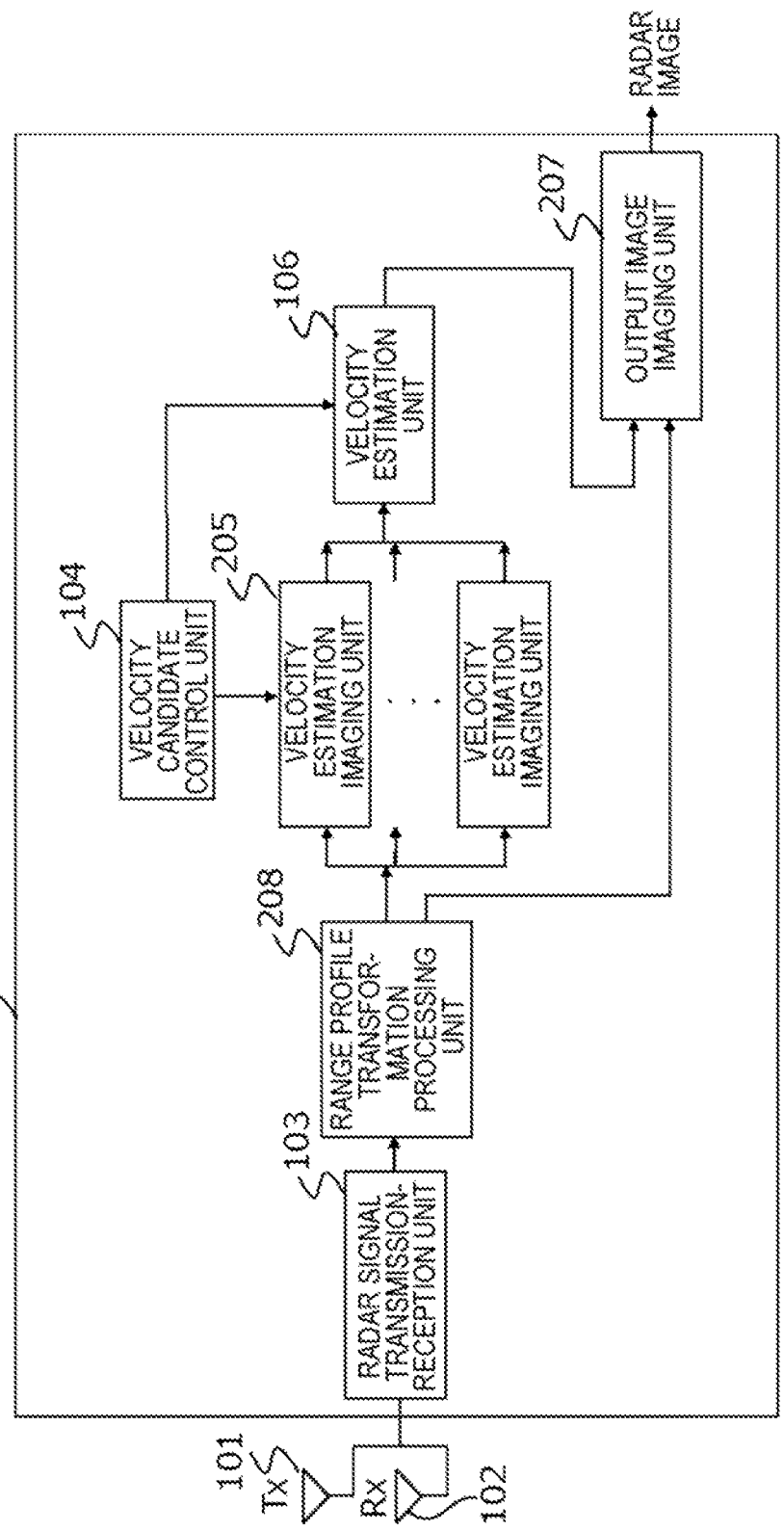
FIG. 11 is a block diagram illustrating a configuration example of a radar apparatus according to a second example embodiment.

FIG. 11 is a block diagram illustrating a configuration example of a radar apparatus according to a second example embodiment. The radar apparatus 200 according to the second example embodiment includes a radar signal transmission-reception unit 103, a range profile transformation processing unit 208, a velocity candidate control unit 104, a velocity estimation imaging unit 205, a velocity estimation unit 106, and an output image imaging unit 207. The radar signal transmission-reception unit 103 includes a transmission antenna (Tx) 101 and a reception antenna (Rx) 102.

The second example embodiment is based on the premise that emission of one SFCW by each Tx as illustrated in FIG. 5 is negligibly short and a measurement time of a radar signal $S(n, m, f)$ can be represented by $t(n, m)$ [or simply $t(n)$].

The range profile transformation processing unit 208 transforms a radar signal $S(n, m, f)$ into a range profile $f(n, m, r)$ defined by equation 11 for each $(n, m)$. Use of inverse Fourier transformation (IFFT) enables efficient computation. The acquired range profile is output to the velocity estimation imaging unit 205 and the output image imaging unit 207.

$$f(n, m, r) = \sum_f S(n, m, f)\exp\left[i\frac{2\pi f}{c}r\right] \quad \text{equation 11}$$

While a radar image generated by each of the velocity estimation imaging unit 205 and the output image imaging unit 207 is the same as that in the first example embodiment, a radar image $I_{v\_vec}(x_{vec})$ is computed from a range profile by using equation 12 instead of equation 3 at that time.

$$I_{\vec{v}}(\vec{x}) = \Sigma_n \Sigma_m f(n, m, R_{nm}(\vec{x}+\vec{v}\,t(n,m))) \quad \text{equation 12}$$

Description of Operation

Figure 12:
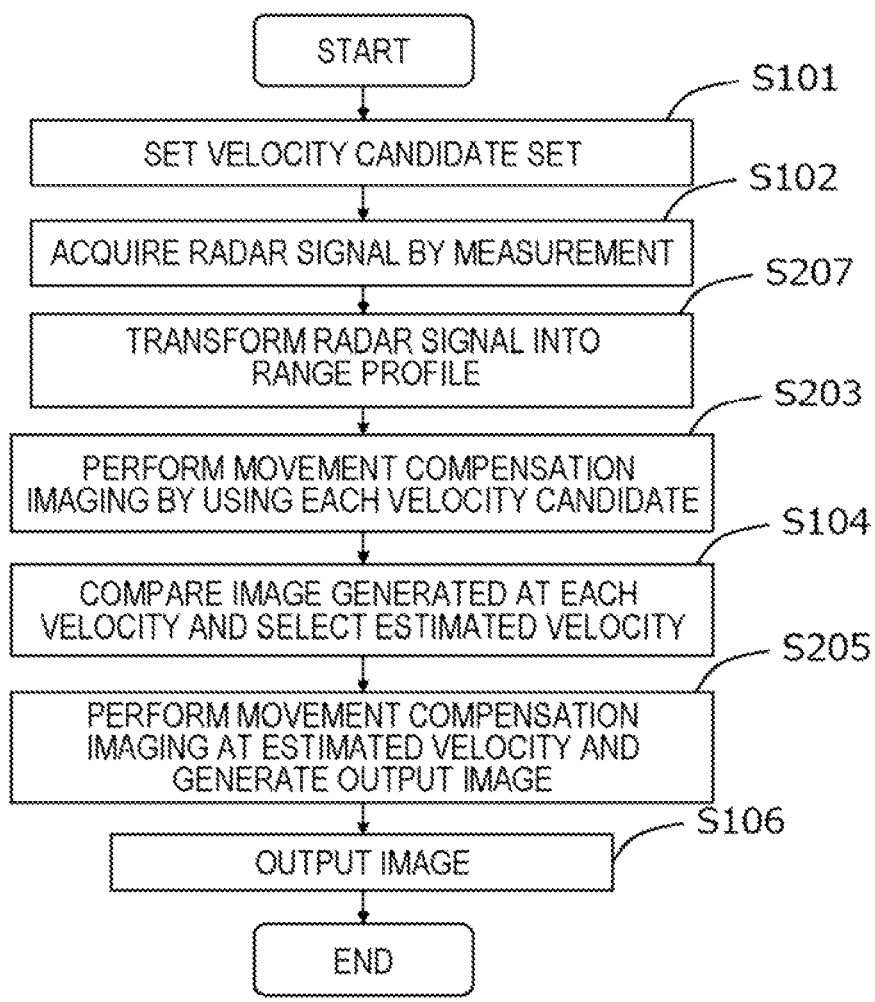
FIG. 12 is a flowchart illustrating operation of the radar apparatus according to the second example embodiment.

Next, operation of the radar apparatus 200 is described with reference to a flowchart in FIG. 12.

Processing in Step S101 is the same as that in the first example embodiment.

Processing in Step S102 is the same as that in the first example embodiment. However, a notation of $t(n, m)$ or $t(n)$ is used for the measurement time of the radar signal $S(n, m, f)$. Further, an output destination of the radar signal and the measurement time is the range profile transformation processing unit 208.

In Step S207, the range profile transformation processing unit 208 transforms the radar signal $S(n, m, f)$ into a range profile $f(n, m, r)$ in accordance with equation 11 and outputs the profile to the velocity estimation imaging unit 205 and the output image imaging unit 207.

In Step S203, each velocity estimation imaging unit 105 generates a radar image $I_{v\_vec}(x_{vec})$ applied with movement compensation in accordance with equation 12 by using a velocity candidate $v_{vec}$ for which the velocity estimation imaging unit 105 is responsible for. The radar image is output to the velocity estimation unit 106.

Processing in Step S104 is the same as that in the first example embodiment.

In Step S205, the output image imaging unit 107 generates a final output image actually used for suspicious object inspection and the like, in accordance with equation 12 by using an estimated velocity $v_{vec,est}$.

Processing in Step S106 is the same as that in the first example embodiment.

Description of Effects

Advance computation of equation 11 being common computation between both the velocity estimation imaging unit 205 and the output image imaging unit 207 enables achievement of processing similar to that according to the first example embodiment with a reduced amount of computation. Use of inverse Fourier transformation (IFFT) in the computation of equation 11 particularly enables significant reduction in an amount of computation.

Third Example Embodiment

Description of Configuration

Figure 13:
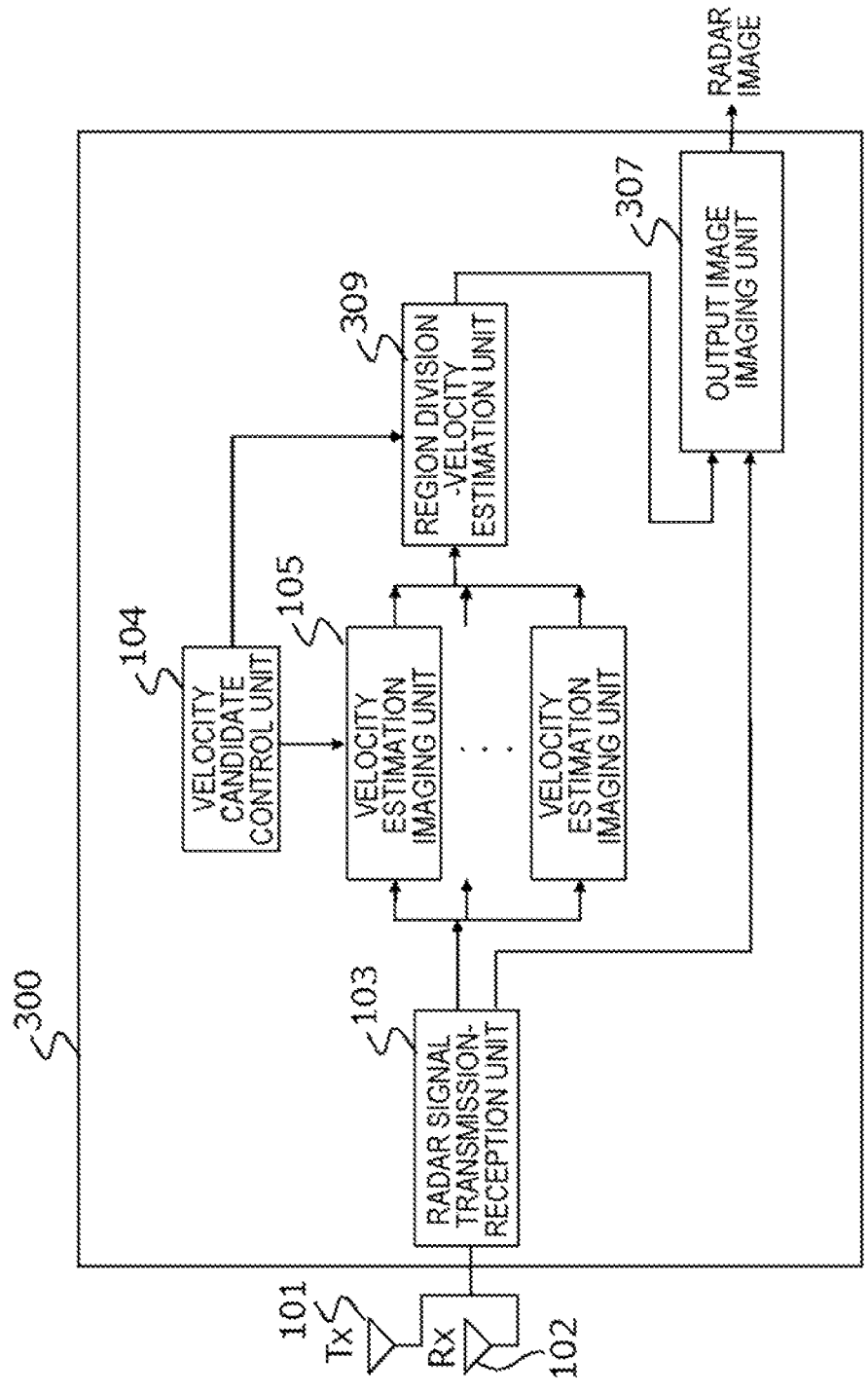
FIG. 13 is a block diagram illustrating a configuration example of a radar apparatus according to a third example embodiment.

FIG. 13 is a block diagram illustrating a configuration example of a radar apparatus according to a third example embodiment. The radar apparatus 300 according to the third example embodiment includes a radar signal transmission-reception unit 103, a velocity candidate control unit 104, a velocity estimation imaging unit 105, a region division-velocity estimation unit 309, and an output image imaging unit 307. The radar signal transmission-reception unit 103 includes a transmission antenna (Tx) 101 and a reception antenna (Rx) 102.

A human body generally does not move at the same velocity as a whole during walking, and a body, an arm, a leg and the like have different velocities. Thus, for each region, a plurality of velocities are estimated and movement compensation is performed, according to the third example embodiment.

Based on a radar image $I_{v\_vec}(x_{vec})$ generated by each velocity estimation imaging unit 105, the region division-velocity estimation unit 309 divides a spatial region (imaging region) in which a radar image is computed into a plurality of regions $T_k$ (where k=1, 2, . . . ) and computes an estimated velocity for each divided region. The region division method and the estimated velocity in each region are output to the output image imaging unit 307.

Figure 14:
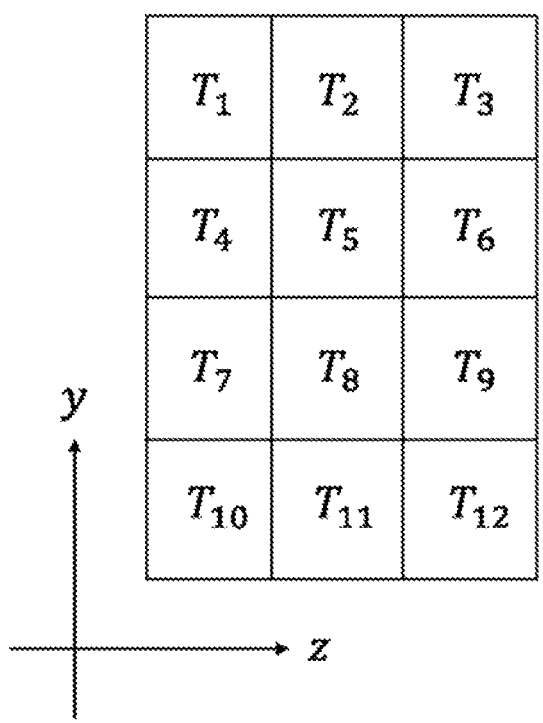
FIG. 14 is a diagram illustrating an example of region division of an imaging region.

Examples of the region division method include a method of division in a mesh form at a predetermined spacing on a y-z plane as illustrated in FIG. 14.

A method of using a result of clustering each cell in a radar image may also be included as another method. For example, clustering is performed with a cell $x_{vec}$ having a certain intensity or greater as a target by the method described in NPL 3 or the like, and division into regions $T_k$ is performed based on the result. The determination of whether each cell $x_{vec}$ has the certain intensity or greater is made by equation 13 or the like by using the threshold value K defined in equation 10 and the like. A cell $x_{vec}$ not used in the clustering (not having the certain intensity or greater)

may be handled as a cell belonging to a cluster closest to the cell, and each region $T_k$ may be determined. Further, a region related to a cell not used in the clustering may not be used in imaging for an output image, and the cell may be handled as a cell not included in any region.

$$\max_{\vec{v} \in V_{cand}} |I_{\vec{v}}(\vec{x})| \geq K \quad \text{equation 13}$$

After region division, an estimated velocity $v_{vec,est,k}$ is computed for each region $T_k$. For example, a velocity candidate $v_{vec}$ maximizing $P_{k,v\_vec}$ computed in accordance with equation 14 is selected and is determined to be an estimated velocity $v_{vec,est,k}$. Alternatively, a method similar to that based on comparison of $Q_{v\_vec}$ being computed in equation 8 and being described in the first example embodiment is practiced on a region $T_k$ in a limited manner, and the selected velocity candidate $v_{vec}$ may be determined to be an estimated velocity $v_{vec,est,k}$.

$$P_{k,\vec{v}} = \max_{\vec{x} \in T_k} |I_{\vec{v}}(\vec{x})| \quad \text{equation 14}$$

The output image imaging unit 307 generates a radar image $I_{fin}(x_{vec})$ in accordance with equation 15 by using regions $T_k$ computed by the region division-velocity estimation unit 309 and an estimated velocity $v_{vec,est,k}$ in each region $T_k$. Note that $v_{vec}(x_{vec})$ represents an estimated velocity $v_{vec,est}k$ in a region $T_k$ including $x_{vec}$. Note that when $x_{vec}$ not included in any region exists, computation may be omitted for such $x_{vec}$, and $I_{fin}(x_{vec})=0$ may be set.

$$I_{fin}(\vec{x}) = \sum_n \sum_m \sum_f S(n,m,f) \exp\left[i\frac{2\pi f}{c} R_{nm}(\vec{x} + \vec{v}(\vec{x})t(n,m,f))\right] \quad \text{equation 15}$$

Description of Operation

Figure 15:
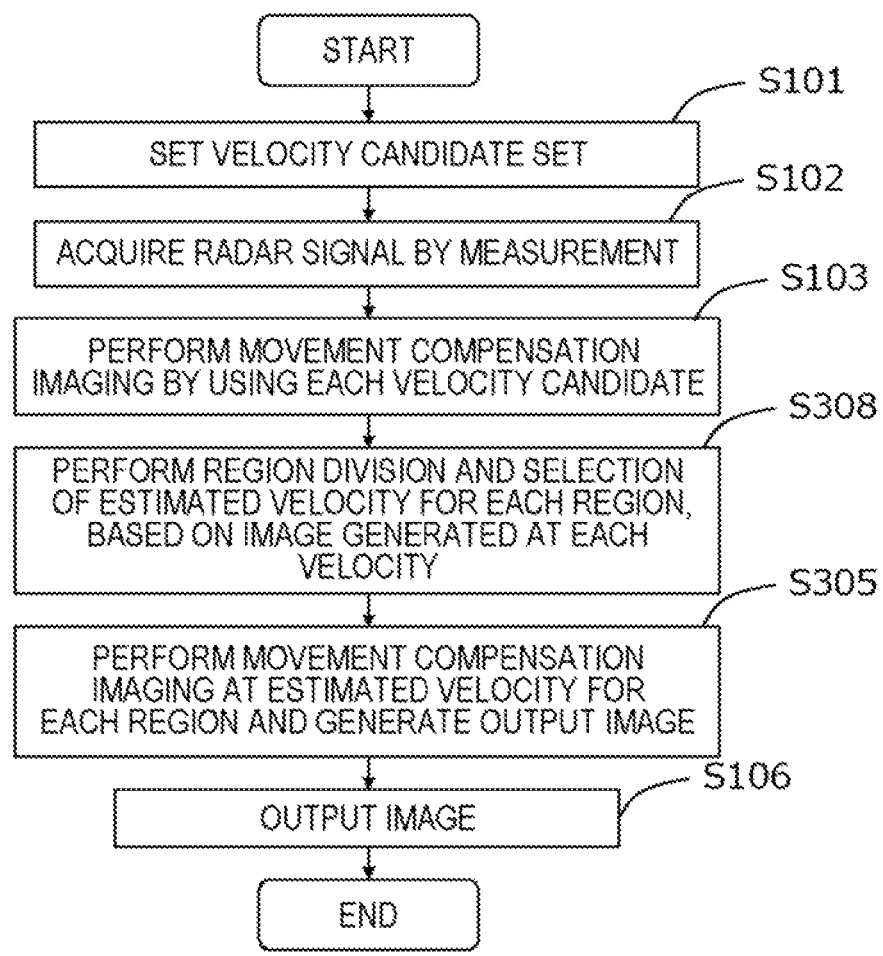
FIG. 15 is a flowchart illustrating operation of the radar apparatus according to the third example embodiment.

Next, operation of the radar apparatus 300 is described with reference to a flowchart in FIG. 15.

Processing in Step S103 is the same as that in the first example embodiment. However, a radar image $I_{v\_vec}(x_{vec})$ applied with movement compensation is output to the region division-velocity estimation unit 309.

In Step S308, the region division-velocity estimation unit 309 divides an imaging region into a plurality of regions $T_k$ (where k=1, 2, ... ), based on each radar image $I_{v\_vec}(x_{vec})$, and computes an estimated velocity $v_{vec,est,k}$ for each divided region $T_k$. The regions $T_k$ and the estimated velocity $v_{vec,est,k}$ for each region $T_k$ are output to the output image imaging unit 307.

In Step S305, the output image imaging unit 307 generates a final output image $I_{fin}(x_{vec})$ actually used for suspicious object inspection and the like, in accordance with equation 15.

Processing in Step S106 is the same as that in the first example embodiment.

Description of Effects Performing movement compensation at a velocity varying with each part of a human body enables generation of a higher precision radar image.

Fourth Example Embodiment

Description of Configuration

Figure 16:
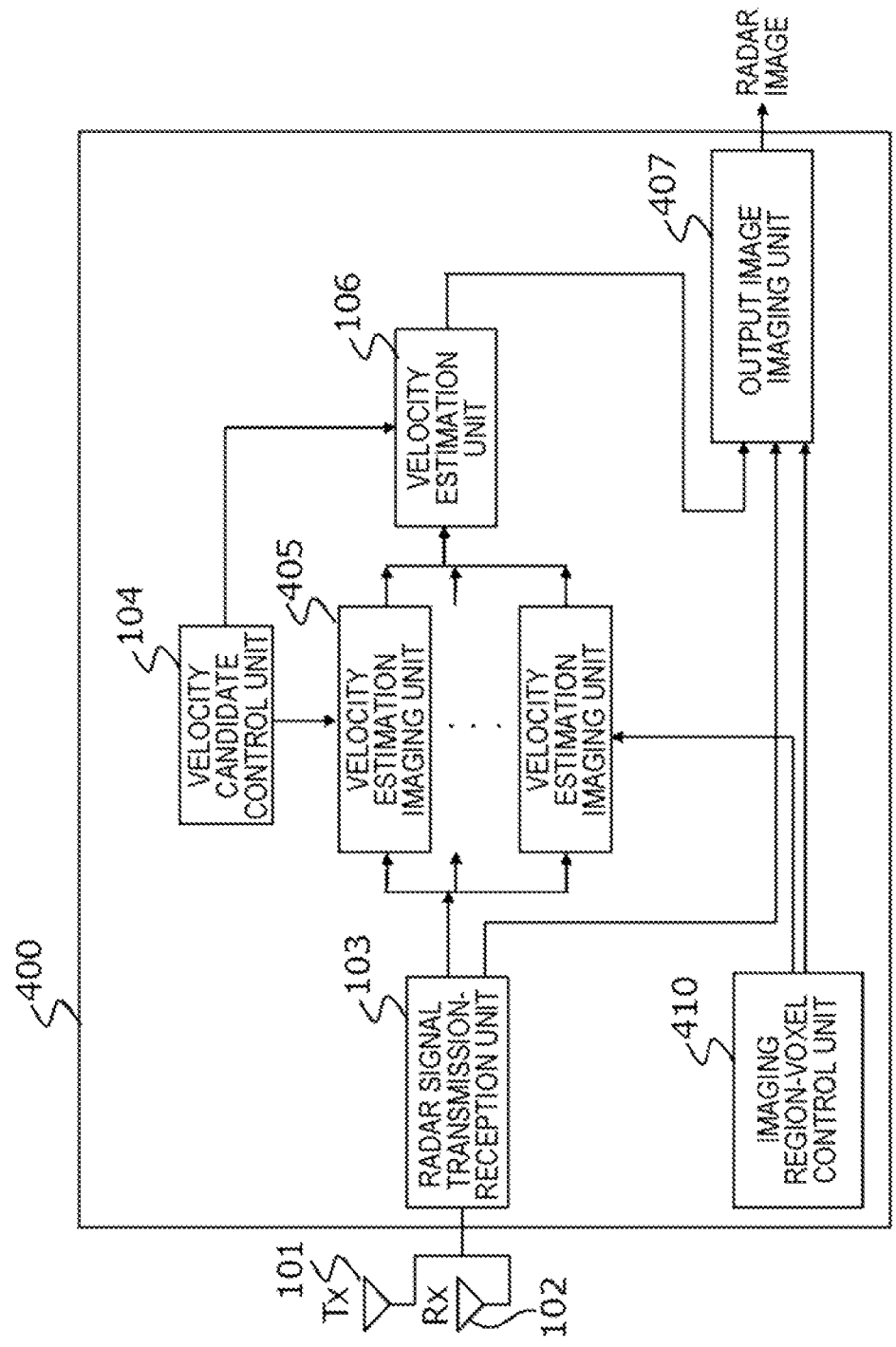
FIG. 16 is a block diagram illustrating a configuration example of a radar apparatus according to a fourth example embodiment.

FIG. 16 is a block diagram illustrating a configuration example of a radar apparatus according to a fourth example embodiment. The radar apparatus 400 according to the fourth example embodiment includes a radar signal transmission-reception unit 103, a velocity candidate control unit 104, an imaging region-voxel control unit 410, a velocity estimation imaging unit 405, a velocity estimation unit 106, and an output image imaging unit 407. The radar signal transmission-reception unit 103 includes a transmission antenna (Tx) 101 and a reception antenna (Rx) 102.

The imaging region-voxel control unit 410 holds a setting of a spatial region (imaging region) in which a radar image is computed and voxel division of the region in each of the velocity estimation imaging unit 405 and the output image imaging unit 407. For example, the aforementioned information is preset by an administrator. The imaging region may vary between the units. For example, while an entire human body is desirably captured in a radar image output by the output image imaging unit 407, a radar image generated by the velocity estimation imaging unit 405 is used only for velocity estimation, and therefore limiting the image to a region in which part of a human body, such as a body, is captured may be considered. Further, the voxel division may vary between the units. For example, computation of a radar image generated by the velocity estimation imaging unit 405 with coarse voxels as described in the first example embodiment may be considered.

When a requirement for an entire amount of computation exists, the setting of voxel division needs to be performed in such a way as to satisfy the requirement. Denoting the number of voxels used by each velocity estimation imaging unit 405 by $N_1$ and the number of voxels used by the output image imaging unit 407 by $N_2$, the entire amount of computation is proportional to a value computed by equation 16. Accordingly, a constraint expressed by equation 17 is generated by using a certain upper limit U.

$$|V_{cand}|N_1+N_2 \quad \text{equation 16}$$

$$|V_{cand}|N_1+N_2 \leq U \quad \text{equation 17}$$

The setting to the imaging region-voxel control unit 410 is performed taking the aforementioned description into consideration.

Each of the velocity estimation imaging unit 405 and the output image imaging unit 407 generates a radar image in accordance with equation 3 or the like on $x_{vec}$ determined from the setting in the imaging region-voxel control unit 410.

Description of Operation

Figure 17:
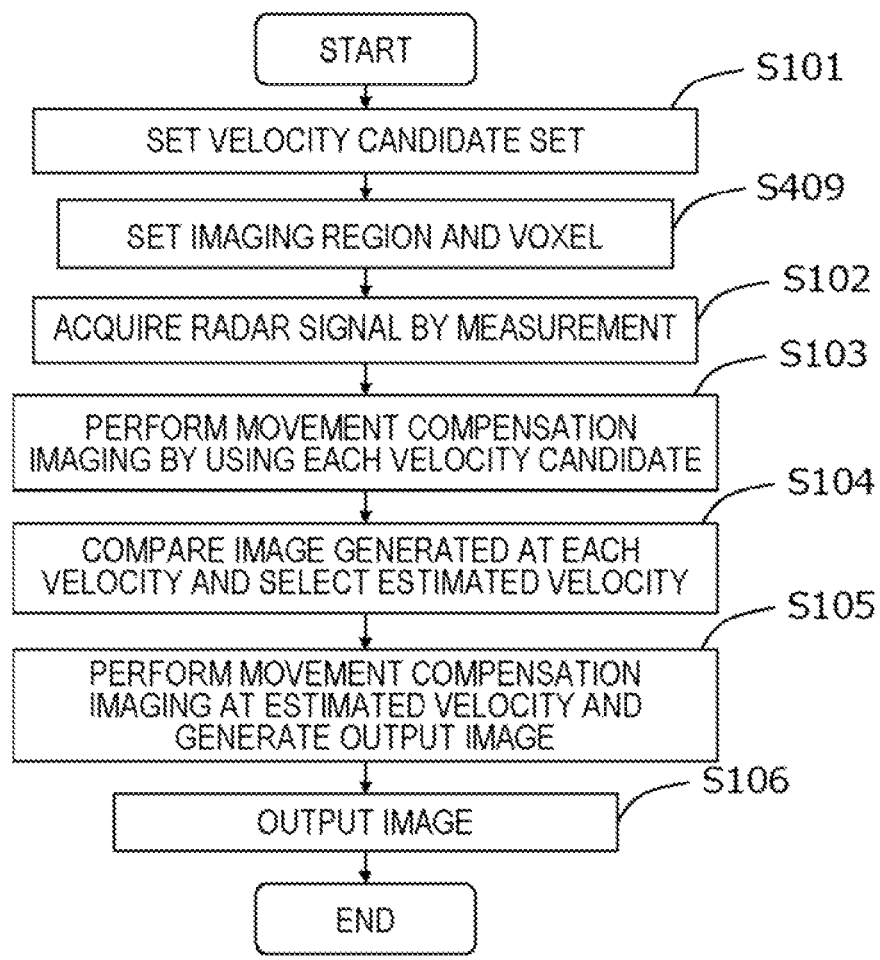
FIG. 17 is a flowchart illustrating operation of the radar apparatus according to the fourth example embodiment.

Next, operation of the radar apparatus 400 is described with reference to a flowchart in FIG. 17.

Processing in Step S101 is the same as that in the first example embodiment.

In Step S409, a setting of an imaging region and voxel division thereof in each of the velocity estimation imaging unit 405 and the output image imaging unit 407 is made and is held in the imaging region-voxel control unit 410.

Processing in Step S102 is the same as that in the first example embodiment.

Processing in Step S103 is the same as that in the first example embodiment. However, the imaging region-voxel control unit 410 is referred to for $x_{vec}$ in computation of a radar image.

Processing in Step S104 is the same as that in the first example embodiment.

Processing in Step S105 is the same as that in the first example embodiment. However, the imaging region-voxel control unit 410 is referred to for $x_{vec}$ in computation of a radar image.

Processing in Step S106 is the same as that in the first example embodiment.

Description of Effects

Suitable setting of the number of voxels significantly related to an amount of computation enables generation of a radar image in a desired processing time. Thus, for example, image update can be performed at a desired frame rate.

Fifth Example Embodiment

Description of Configuration

Figure 18:
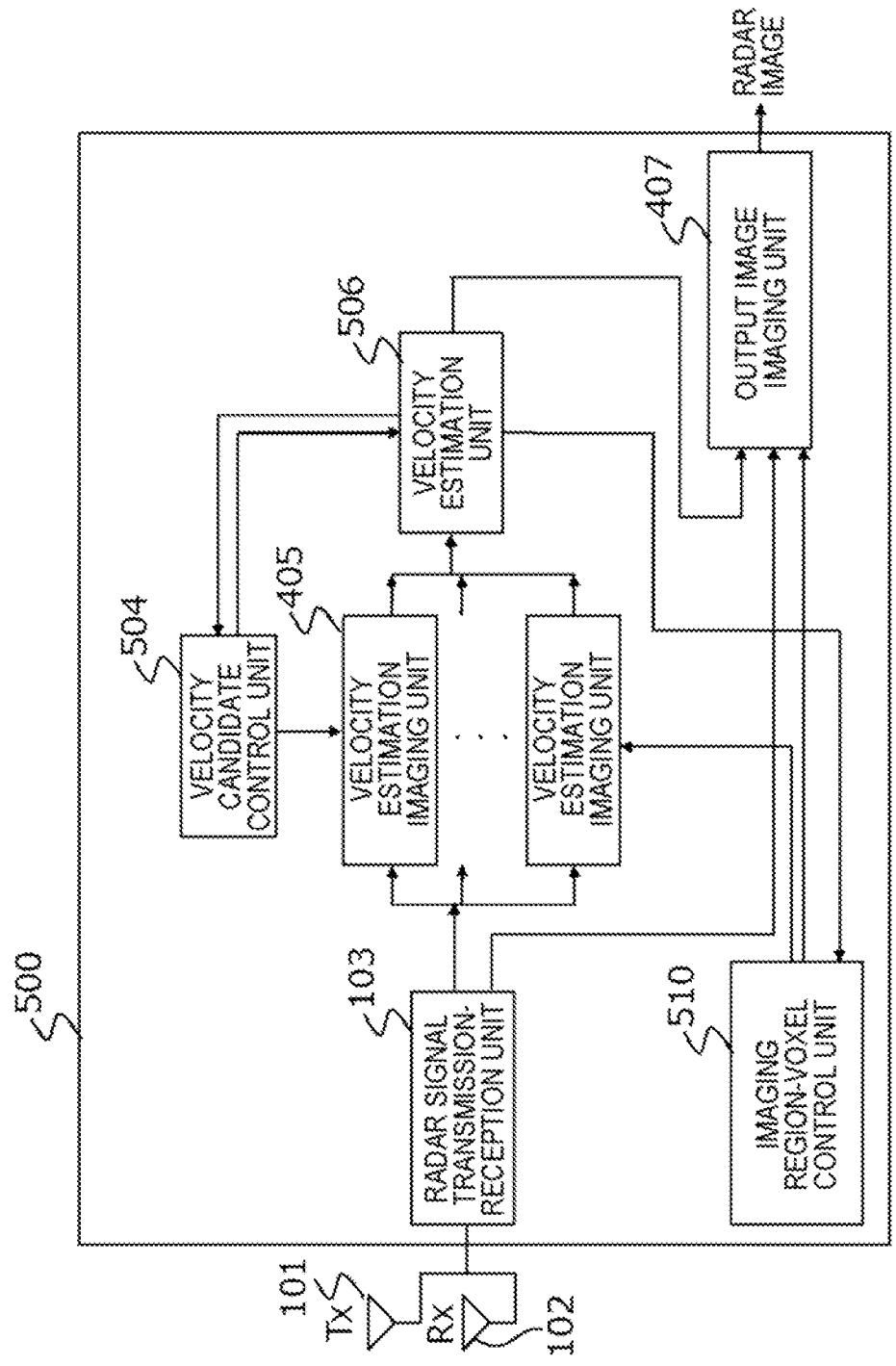
FIG. 18 is a block diagram illustrating a configuration example of a radar apparatus according to a fifth example embodiment.

FIG. 18 is a block diagram illustrating a configuration example of a radar apparatus according to a fifth example embodiment. The radar apparatus 500 according to the fifth example embodiment includes a radar signal transmission-reception unit 103, a velocity candidate control unit 504, an imaging region-voxel control unit 510, a velocity estimation imaging unit 405, a velocity estimation unit 506, and an output image imaging unit 407. The radar signal transmission-reception unit 103 includes a transmission antenna (Tx) 101 and a reception antenna (Rx) 102.

Settings of the velocity candidate control unit 504 and the imaging region-voxel control unit 510 receive feedback and are updated as needed by using information acquired by the velocity estimation unit 506, according to the fifth example embodiment.

The velocity estimation unit 506 has a function of outputting, to the velocity candidate control unit 504 and the imaging region-voxel control unit 510, information used for setting update thereof, in addition to the function described in the first example embodiment.

A computed estimated velocity $v_{vec,est}$ is included in the information used for setting update. A method of additionally using a standing position of a subject, that is, a position $(x_0, z_0)$ on an x-z plane estimated from a radar image $I_{v\_vec}(x_{vec})$ may be considered. For example, the standing position is computed as $(x, z)$ maximizing an intensity indicator as expressed in equation 18.

$$T(x, z) = \max_{\vec{v} \in V_{cand}} \max_y |I_{\vec{v}}(x, y, z)| \qquad \text{equation 18}$$

How to perform setting update of the velocity candidate control unit 504 and the imaging region-voxel control unit 510 from the aforementioned information is described in the description of each functional unit.

The velocity candidate control unit 504 has a function of updating a velocity candidate set $V_{cand}$, based on an output of the velocity estimation unit 506, in addition to the function described in the first example embodiment. Examples of the update method include selecting and re-setting values close to an estimated velocity $v_{vec,est}$ at a predetermined level or higher (such as values the difference between each and an estimated velocity $v_{vec,est}$ is a predetermined threshold value or less) in smaller steps, since movement of a subject generally does not vary significantly between consecutive measurements (in this case, the number of velocity candidates $v_{vec}$ is the same as before the update, and the difference between the maximum value and the minimum value of the velocity candidate $v_{vec}$ and the difference between values of consecutive velocity candidates $v_{vec}$ are smaller than before the update). Further, the number of velocity candidates $v_{vec}$ may be varied. By particularly taking advantage of a situation that only values close to the estimated velocity $v_{vec,est}$ need to be checked, the number of velocity candidates may be less than the initial setting. At that time, with respect to the velocity estimation imaging unit 405, a measure such as varying the number of functional units (the number of velocity estimation imaging units 405) according to the change in the number of velocity candidates or partially suspending the unit is taken.

The imaging region-voxel control unit 510 has a function of updating a setting of an imaging region and voxel division thereof in each of the velocity estimation imaging unit 405 and the output image imaging unit 407, based on an output of the velocity estimation unit 506, in addition to the function described in the fourth example embodiment. For example, update may be limited only to the neighborhood of a standing position $(x_0, z_0)$ of a subject as a setting of an imaging region. As a specific example, setting may be performed only on a region satisfying a condition in equation 19 expressed by using certain d as an imaging region in the output image imaging unit 407.

$$\max(|x-x_0|, |z-z_0|) \leq d \qquad \text{equation 19}$$

As for an imaging region in the velocity estimation imaging unit 405, setting may be performed only on a region satisfying a condition in equation 20 expressed by using certain d' in consideration of an amount of movement of a subject in a time $\Delta t$ until a next measurement. Note that $v_{est,x}$ and $v_{est,z}$ represent x- and z-components of an estimated velocity $v_{vec,est}$, respectively. In either case, the voxel division may not be changed from the initial setting or may be more densely divided in such a way as to increase computation precision by taking advantage of a situation that an amount of computation is kept down due to a region being narrowly limited.

$$\max(|x-(x_0+v_{est,x}\Delta t)|, |z-(z_0+v_{est,z}\Delta t)|) \leq d' \qquad \text{equation 20}$$

Note that, while an example of feeding back information acquired by the velocity estimation unit 506 to the settings of both the velocity candidate control unit 504 and the imaging region-voxel control unit 510 has been presented as a description of the fifth example embodiment, the present example embodiment is not limited thereto, and the feedback from the velocity estimation unit 506 may be given to either the velocity candidate control unit 504 or the imaging region-voxel control unit 510.

Description of Operation

Figure 19:
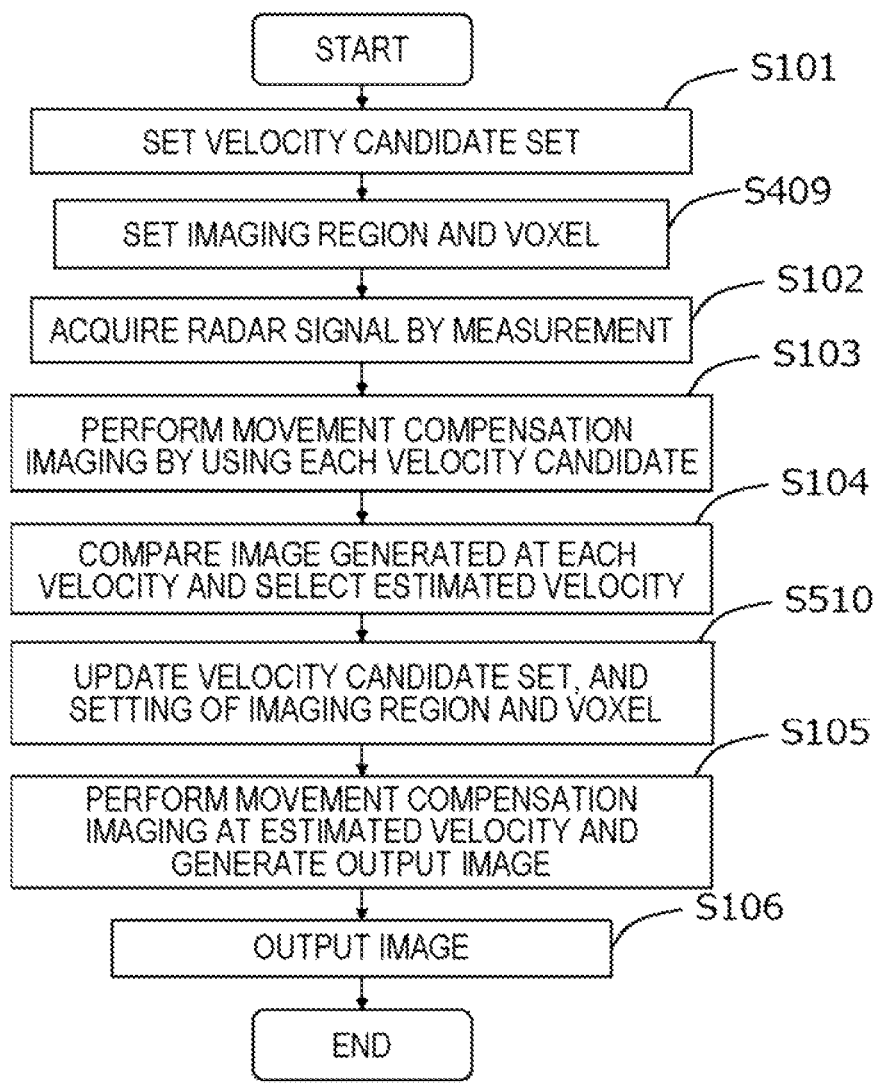
FIG. 19 is a flowchart illustrating operation of the radar apparatus according to the fifth example embodiment.

Next, operation of the radar apparatus 500 is described with reference to a flowchart in FIG. 19.

Processing other than Step S510 is the same as that in the fourth example embodiment.

In Step S510, the velocity estimation unit 506 outputs information used for setting update to the velocity candidate control unit 504 and the imaging region-voxel control unit 510. Based on the output of the velocity estimation unit 506, the velocity candidate control unit 504 updates a velocity candidate set $V_{cand}$. Based on the output of the velocity estimation unit 506, the imaging region-voxel control unit 510 updates the setting of an imaging region and voxel division thereof in each of the velocity estimation imaging unit 405 and the output image imaging unit 407.

Description of Effects

Limiting a velocity candidate to only a highly likely value based on current measurement status enables precision of velocity estimation to be enhanced due to reduction in an amount of computation and selection of velocity candidates in smaller steps. Similarly, limiting an imaging region to only a region in which a subject is highly likely to exist enables precision of an image to be enhanced due to reduction in an amount of computation and finer voxel division.

Hardware Configuration

Figure 20:
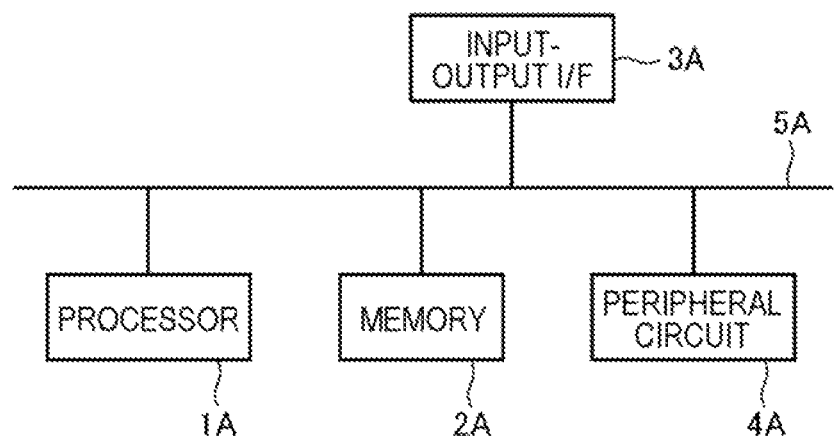
FIG. 20 is a diagram illustrating an example of a hardware configuration of the radar apparatuses according to the first to fifth example embodiments.

Next, an example of hardware configuration of the radar apparatuses 100 to 500 is described. FIG. 20 is a diagram illustrating an example of a hardware configuration of the radar apparatuses 100 to 500. For example, each functional unit included in the radar apparatuses 100 to 500 is provided by any combination of hardware and software centering on a central processing unit (CPU), a memory, a program loaded in the memory, a storage unit storing the program such as a hard disk [capable of storing not only a program previously stored in a shipping stage of the apparatus but also a program downloaded from a storage medium such as a compact disc (CD) or from a server on the Internet], and a network connection interface in any computer. Then, it should be understood by a person skilled in the art that various modifications to the providing method and the apparatus can be made.

As illustrated in FIG. 20, each of the radar apparatuses 100 to 500 includes a processor 1A, a memory 2A, an input-output interface 3A, a peripheral circuit 4A, and a bus 5A. The peripheral circuit 4A includes various modules. Each of the radar apparatuses 100 to 500 may not include the peripheral circuit 4A. Note that each of the radar apparatuses 100 to 500 may be configured with a plurality of physically and/or logically separated apparatuses or may be configured with a physically and logically integrated single apparatus. When an apparatus is configured with a plurality of physically and/or logically separated apparatuses, each of the plurality of apparatuses may include the aforementioned hardware configuration.

The bus 5A is a data transmission channel for the processor 1A, the memory 2A, the peripheral circuit 4A, and the input-output interface 3A to transmit and receive data to and from one another. Examples of the processor 1A include arithmetic processing units such as a CPU and a graphics processing unit (GPU). Examples of the memory 2A include memories such as a random access memory (RAM) and a read only memory (ROM). The input-output interface 3A includes an interface for acquiring information from an input apparatus, an external apparatus, an external server, an external sensor, and the like and an interface for outputting information to an output apparatus, the external apparatus, the external server, and the like. Examples of the input apparatus include a keyboard, a mouse, and a microphone. Examples of the output apparatus include a display, a speaker, a printer, and a mailer. The processor 1A can give an instruction to each module and perform an operation, based on the operation result by the module.

The aforementioned example embodiments may also be described in whole or in part as the following supplementary notes but are not limited thereto.

1. A radar apparatus including:
   a radar signal transmission-reception unit acquiring a radar signal acquired by measurement using a transmission antenna and a reception antenna, and a measurement time of the radar signal;
   a velocity candidate control unit holding a setting of a velocity candidate set of a target object;
   a velocity estimation imaging unit generating a radar image applied with movement compensation by using each velocity candidate;
   a velocity estimation unit selecting an estimated velocity from a velocity candidate set, based on comparison of each generated radar image; and
   an output image imaging unit generating a final output image applied with movement compensation using an estimated velocity.
2. The radar apparatus according to 1., wherein
   the velocity candidate control unit includes, as a velocity candidate set, one or more velocity candidates speeds of which are varied in a step-by-step manner in movement parallel to a passage direction.
3. The radar apparatus according to 1. or 2., wherein
   the velocity estimation unit selects an estimated velocity, based on comparison of an indicator computed from intensity of a radar image generated by the velocity estimation imaging unit.
4. The radar apparatus according to 3., wherein
   an indicator computed from intensity of a radar image is maximum intensity or total intensity of a radar image.
5. The radar apparatus according to 1. or 2., wherein
   the velocity estimation unit performs ranking on each velocity candidate for each of one or more cells by using a radar image generated by the velocity estimation imaging unit, computes a value acquired by totaling a score based on the rank for all cells for each velocity candidate, and selects an estimated velocity, based on comparison of the totaled value.
6. The radar apparatus according to 5., wherein
   a radar image is projected in a passage direction and is transformed into a two-dimensional image before ranking on each velocity candidate for each cell is performed.
7. The radar apparatus according to any one of 1. to 6., further including
   a range profile transformation processing unit transforming a radar signal into a range profile, wherein
   the velocity estimation imaging unit and the output image imaging unit perform generation of a radar image by using a range profile.
8. The radar apparatus according to any one of 1. to 7., including,
   in place of the velocity estimation unit, a region division-velocity estimation unit dividing an imaging region in which a radar image is computed into a plurality of regions and computing an estimated velocity for each divided region, wherein
   the output image imaging unit generates a final output image applied with movement compensation using an estimated velocity for each region.
9. The radar apparatus according to 8., wherein
   division of an imaging region by the region division-velocity estimation unit is performed by division in a mesh form at a predetermined spacing in a plane perpendicular to a passage direction.
10. The radar apparatus according to 8., wherein
    division of an imaging region by the region division-velocity estimation unit is performed based on a clustering result of a high-intensity cell in a radar image generated by the velocity estimation imaging unit.
11. The radar apparatus according to any one of 1. to 10., further including
    an imaging region-voxel control unit holding a setting of an imaging region and voxel division thereof in each of the velocity estimation imaging unit and the output image imaging unit.

12. The radar apparatus according to 11., wherein
the imaging region-voxel control unit performs setting in such a way that a total value of a product of a number of one or more voxels by a number of the velocity candidates in the velocity estimation imaging unit and a number of one or more voxels in the output image imaging unit is a certain value or less.
13. The radar apparatus according to 11. or 12., wherein
the imaging region-voxel control unit updates a setting method of an imaging region and voxel division thereof in each of the velocity estimation imaging unit and the output image imaging unit by using a movement estimation radar image collected in the velocity estimation unit and information about a computed estimated velocity.
14. The radar apparatus according to 13., wherein
the velocity estimation unit outputs information about a position of a target object to the imaging region-voxel control unit, and
the imaging region-voxel control unit limits an imaging region in the output image imaging unit to an area around a position of a target object.
15. The radar apparatus according to 13. or 14., wherein
the velocity estimation unit outputs information about a position of a target object and an estimated velocity to the imaging region-voxel control unit, and
the imaging region-voxel control unit estimates a position of a target object at a next measurement, based on the information, and limits an imaging region in the velocity estimation imaging unit to an area around an estimated position.
16. The radar apparatus according to any one of 1. to 15., wherein
the velocity candidate control unit updates a setting of a velocity candidate set of a target object by using a movement estimation radar image collected in the velocity estimation unit and information about a computed estimated velocity.
17. The radar apparatus according to 16., wherein
the velocity candidate control unit updates a setting of a velocity candidate set in such a way that the velocity candidate set includes only a value close to an estimated velocity computed by the velocity estimation unit at a predetermined level or higher.
18. An imaging method including, by a computer:
acquiring a radar signal acquired by measurement using a transmission antenna and a reception antenna, and a measurement time of the radar signal;
holding a setting of a velocity candidate set of a target object;
generating a radar image applied with movement compensation by using each velocity candidate;
selecting an estimated velocity from a velocity candidate set, based on comparison of each generated radar image; and
generating a final output image applied with movement compensation using an estimated velocity.
19. An imaging program causing a computer to function as:
a radar signal transmission-reception means for acquiring a radar signal acquired by measurement using a transmission antenna and a reception antenna, and a measurement time of the radar signal;
a velocity candidate control means for holding a setting of a velocity candidate set of a target object;
a velocity estimation imaging means for generating a radar image applied with movement compensation by using each velocity candidate;
a velocity estimation means for selecting an estimated velocity from a velocity candidate set, based on comparison of each generated radar image; and
an output image imaging means for generating a final output image applied with movement compensation using an estimated velocity.

The invention claimed is:
1. A radar apparatus comprising:
at least one memory configured to store one or more instructions; and
at least one processor configured to execute the one or more instructions to:
acquire a radar signal acquired by measurement using a transmission antenna and a reception antenna, and a measurement time of the radar signal;
hold a setting of a velocity candidate set of a target object;
generate a radar image applied with movement compensation by using each velocity candidate;
perform ranking on each velocity candidate for each of one or more cells by using the radar image applied with movement compensation;
compute a value acquired by totaling a score based on the rank for all cells for each velocity candidate;
select an estimated velocity from the velocity candidate set, based on comparison of each generated radar image and based on the totaled value; and
generate a final output image applied with movement compensation using the estimated velocity.
2. The radar apparatus according to claim 1, wherein the processor is further configured to execute the one or more instructions to include, as a velocity candidate set, one or more velocity candidates speeds of which are varied in a step-by-step manner in movement parallel to a passage direction.
3. The radar apparatus according to claim 1, wherein the processor is further configured to execute the one or more instructions to select an estimated velocity, based on comparison of an indicator computed from intensity of the radar image applied with movement compensation.
4. The radar apparatus according to claim 3, wherein an indicator computed from intensity of a radar image is maximum intensity or total intensity of a radar image.
5. The radar apparatus according to claim 1, wherein a radar image is projected in a passage direction and is transformed into a two-dimensional image before ranking on each velocity candidate for each cell is performed.
6. The radar apparatus according to claim 1, wherein the processor is further configured to execute the one or more instructions to:
transform a radar signal into a range profile, and
perform generation of a radar image by using a range profile.
7. The radar apparatus according to claim 1, wherein the processor is further configured to execute the one or more instructions to:
as a process of the selecting the estimated velocity from the velocity candidate set, divide an imaging region in which a radar image is computed into a plurality of regions and select the estimated velocity for each divided region from the velocity candidate set, and
generate a final output image applied with movement compensation using the estimated velocity for each divided region.

8. The radar apparatus according to claim 7, wherein
the dividing an imaging region is performed by division in a mesh form at a predetermined spacing in a plane perpendicular to a passage direction.

9. The radar apparatus according to claim 7, wherein
the dividing an imaging region is performed based on a clustering result of a high-intensity cell in the radar image applied with movement compensation.

10. The radar apparatus according to claim 1, wherein the processor is further configured to execute the one or more instructions to perform a setting of an imaging region and voxel division for each of generating the radar image applied with movement compensation and generating the final output image applied with movement compensation.

11. The radar apparatus according to claim 10, wherein the processor is further configured to execute the one or more instructions to perform the setting of the imaging region and the voxel division for each of generating the radar image and generating the final output image in such a way that a total value of a product of a number of one or more voxels by a number of the velocity candidates for generating the radar image and a number of one or more voxels for generating the final output image is a certain value or less.

12. The radar apparatus according to claim 11, wherein the processor is further configured to execute the one or more instructions to update the way of setting of the imaging region and the voxel division for each of generating the radar image and generating the final output image by using a movement estimation radar image and information about a computed estimated velocity.

13. The radar apparatus according to claim 12, wherein the processor is further configured to execute the one or more instructions to:
output information about a position of a target object, and limit an imaging region for generating the final output image applied with movement compensation to an area around a position of a target object.

14. The radar apparatus according to claim 12, wherein the processor is further configured to execute the one or more instructions to:
output information about a position of a target object and an estimated velocity, and,
estimate a position of a target object at a next measurement, based on the information, and limit an imaging region for generating the radar image applied with movement compensation to an area around an estimated position.

15. The radar apparatus according to claim 1, wherein the processor is further configured to execute the one or more instructions to update a setting of a velocity candidate set of a target object by using a movement estimation radar image and information about a computed estimated velocity.

16. The radar apparatus according to claim 15, wherein the processor is further configured to execute the one or more instructions to update a setting of a velocity candidate set in such a way that the velocity candidate set includes only a value close to the computed estimated velocity at a predetermined level or higher.

17. An imaging method comprising, by a computer:
acquiring a radar signal acquired by measurement using a transmission antenna and a reception antenna, and a measurement time of the radar signal;
holding a setting of a velocity candidate set of a target object;
generating a radar image applied with movement compensation by using each velocity candidate;
perform ranking on each velocity candidate for each of one or more cells by using the radar image applied with movement compensation;
compute a value acquired by totaling a score based on the rank for all cells for each velocity candidate;
selecting an estimated velocity from the velocity candidate set, based on comparison of each generated radar image and based on the totaled value; and
generating a final output image applied with movement compensation using the estimated velocity.

18. A non-transitory storage medium storing an imaging program causing a computer to:
acquire a radar signal acquired by measurement using a transmission antenna and a reception antenna, and a measurement time of the radar signal;
hold a setting of a velocity candidate set of a target object;
generate a radar image applied with movement compensation by using each velocity candidate;
perform ranking on each velocity candidate for each of one or more cells by using the radar image applied with movement compensation;
compute a value acquired by totaling a score based on the rank for all cells for each velocity candidate;
select an estimated velocity from the velocity candidate set, based on comparison of each generated radar image and based on the totaled value; and
generate a final output image applied with movement compensation using the estimated velocity.

* * * * *